T. J. KIN.
PUMP.
APPLICATION FILED JUNE 13, 1912.
1,052,831.
Patented Feb. 11, 1913.
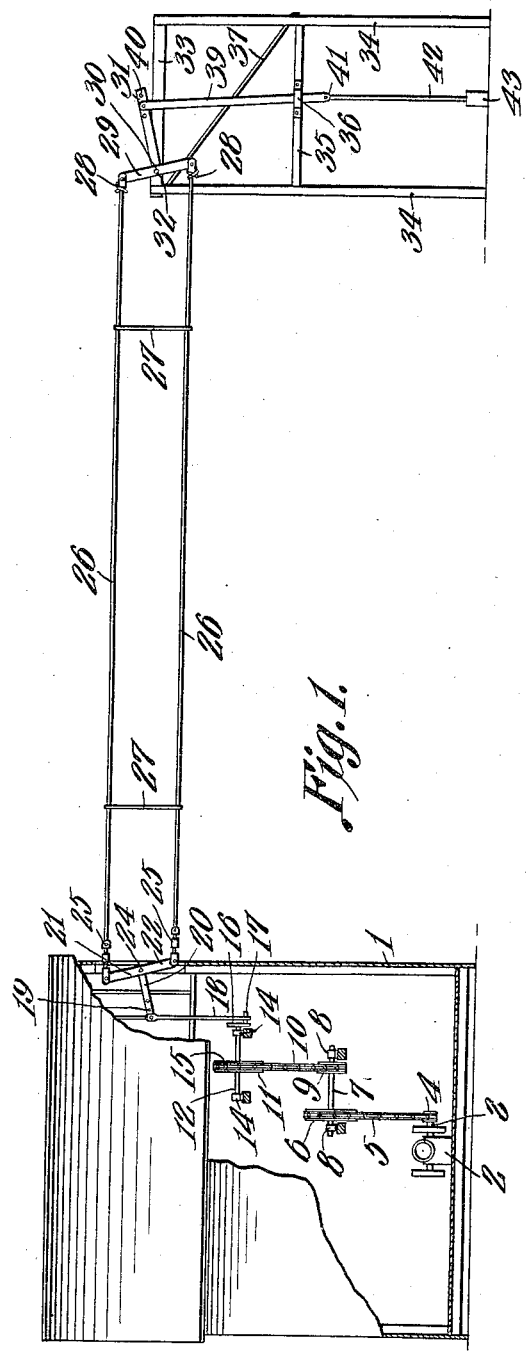
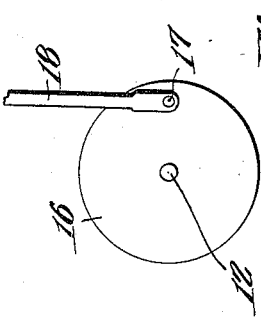
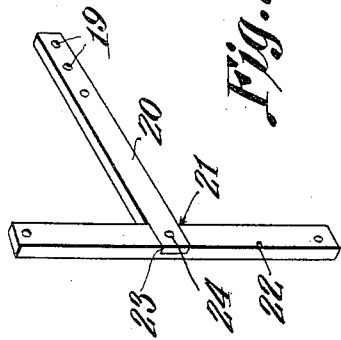
Thomas J. Kin,
Inventor
Witnesses

UNITED STATES PATENT OFFICE.

THOMAS J. KIN, OF FOSTORIA, OHIO.

PUMP.

1,052,831.   Specification of Letters Patent.   Patented Feb. 11, 1913.

Application filed June 13, 1912. Serial No. 703,463.

*To all whom it may concern:*

Be it known that I, THOMAS J. KIN, a citizen of the United States, residing at Fostoria, in the county of Seneca and State of Ohio, have invented a new and useful Pump, of which the following is a specification.

One object of the present invention is to provide mechanism for connecting a prime mover, such as an internal combustion engine, with the piston rod of a pump, to the end that the prime mover may be located at some distance from the well, the prime mover being thus adapted for other uses, in addition to serving as a means for actuating the pumping mechanism.

A further object of the invention is to provide a connecting mechanism which will permit pumping jacks and like structures which encumber the ground, to be dispensed with, the connecting mechanism herein disclosed, being located in an elevated position, so that a vehicle may be driven around the well, and so that the space about the well may be subjected to cultivation, there being no occasion for tramping down the growing crops, about the well.

The invention aims further to provide an elevated connecting mechanism of novel form, to provide novel means for uniting the connecting mechanism operatively with the prime mover, and to provide novel means for uniting the connecting mechanism operatively with the piston rod of the pump.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a perspective of one of the actuating levers; and Fig. 3 is a side elevation of the crank disk and attendant parts.

In carrying out the invention there is provided a supporting structure 1, which may be a building, adapted to house a prime mover, such as an internal combustion engine 2, the crank shaft of which is indicated by the numeral 3. The crank shaft 3 of the engine 2 carries a sprocket wheel 4, about which is trained a primary drive chain 5, passed about a sprocket wheel 6, secured to an auxiliary shaft 7, horizontally disposed, and supported for rotation in bearings 8 which may be carried by any desired portion of the building 1. The sprocket wheel 6 is ordinarily of considerably greater diameter than the sprocket wheel 4.

The auxiliary shaft 7 may be provided with a sprocket wheel 9, about which is passed a secondary sprocket chain 10, trained about a sprocket wheel 11, secured to a supplemental shaft 12, the shaft 12 being journaled for rotation in bearings 14 upheld by the supporting structure 1. The supplemental shaft 12 carries a crank disk 16, provided with a crank pin 17, receiving one end of a pitman 18, the upper end of which is adapted to be pivotally engaged in any one of a plurality of openings 19, formed in the arm 20 of a T shaped lever 21, including a transverse head 22, equipped intermediate its ends with a mortise 23, receiving one end of the arm 20, there being a connecting element 24 uniting the arm 20 with the head 22, the connecting element 24 constituting also a fulcrum for the lever 21, the element 24 being supported by the building 1.

Pivotally secured to the extremities of the head 22 of the lever 21 are turn buckles 25, receiving the ends of a pair of actuating members 26, the actuating members 26 ordinarily taking the form of wires or cables. The actuating members 26 are connected at spaced points, by any number of yokes 27. The outer ends of the actuating members 26 are united with clevises 28, pivoted to the ends of the head 29 of a lever 30, including an angularly disposed arm 31. The lever 30 is a duplicate of the lever 21, and Fig. 2 may be referred to for the purpose of determining the structural details of the lever 30. The lever 30 is pivoted, as indicated at 32, to the top beam 33 of a frame, the frame comprising uprights 34 and a connecting cross bar 35, the cross bar 35 carrying a guide 36. The frame may be braced by a diagonal tie member, indicated at 37, the tie member 37 connecting the uprights 34, and being disposed diagonally to the uprights. It will be understood that the frame above referred to, may be of any desired form. A pitman 39 is mounted to slide in the guide 36, the upper end of the pitman being pivotally mounted in any one of a plurality of holes 40, which are formed in the arm 31 of the lever 30, adjacent the free end of the arm. As indicated at 41, the lower end of the pitman 39 is pivotally connected with the upper end of the pump rod 42, the same being mounted to reciprocate in the pump cylinder 43.

In practical operation, the engine 2 will impart motion to the primary socket chain 5, the chain 5 actuating the auxiliary shaft 7, and the shaft 7 serving to actuate the secondary sprocket chain 10, the sprocket chain 10 actuating the shaft 12, motion being thus imparted to the crank disk 16 which, in its turn, will transmit motion to the pitman 18, the pitman 18 serving to tilt the lever 21, and to operate the members 26. The actuating members 26 will effect a swinging of the lever 30, the same imparting vertical reciprocation to the pitman 39, the pitman 39 actuating the pump rod 42, the pumping operation being thus effected.

Owing to the fact that the sprocket wheel 6 is of larger diameter than the sprocket wheel 4, and owing to the fact that the sprocket wheel 15 is of larger diameter than the sprocket wheel 9, a reducing train is thereby interposed between the engine shaft 3 and the lever 21, whereby a relatively slow motion will be imparted to the lever 21, when the engine 2 operates at the high speed which is common to internal combustion engines. An undue strain upon the connecting mechanism will be avoided thereby.

The turn buckles 25 may be operated to take up slack in the actuating member 26, and undue swinging of the members 26, transversely, will be avoided, owing to the presence of the connecting yokes 27. As will be understood readily, should the distance between the supporting structure 1 and the pump frame be great, the members 26 may be upheld by any suitable auxiliary means, which it is necessary neither to show nor to describe. There will at times, be some slack in the flexible members 26. Therefore, in the absence of the yokes 27, the mechanism will operate with a jerk as the tension is transferred from one of the flexible members 26 to the other. Suppose that the lower end of the head 22 of the lever 21 is swung to the left. Thereupon the lower flexible member 26 will be put under tension to operate the lever 30. As the head 22 of the lever 21 approaches a vertical position, the yokes 27 will move out of a vertical position, thus pulling down upon the upper flexible element 26 which is not under tension. The slack will thereupon be taken out of the upper flexible member 26. Then, when the upper end of the head 22 of the lever 21 moves to the left to put the upper member 26 under tension, there will be no jerk, because the slack in the upper member 26 has been taken out by the action of the yokes 27, it being noted that the yokes 27 stand at acute angles to the transverse heads of the levers.

Having thus described the invention, what is claimed is:—

In a device of the class described, spaced supports; levers including parallel heads fulcrumed on the supports and arms projecting from the heads; a pump operatively connected with one arm; a motor operatively connected with the other arm; flexible elements connecting the ends of the heads; parallel yokes connected at their ends with the flexible elements and supported solely by the flexible elements, the yokes being disposed at acute angles to the heads.

In testimony that I claim the foregoing as my own, I have hereto affixed my signature in the presence of two witnesses.

THOMAS J. KIN.

Witnesses:
HARRY E. KELTNER,
W. E. SCHMITT.

---

Copies of this patent may be obtained for five cents each, by addressing the "Commissioner of Patents, Washington, D. C."